Jan. 16, 1934.  H. N. DILLING  1,943,376
STOKER FOR PULVERIZED FUEL
Filed May 11, 1932   3 Sheets-Sheet 1
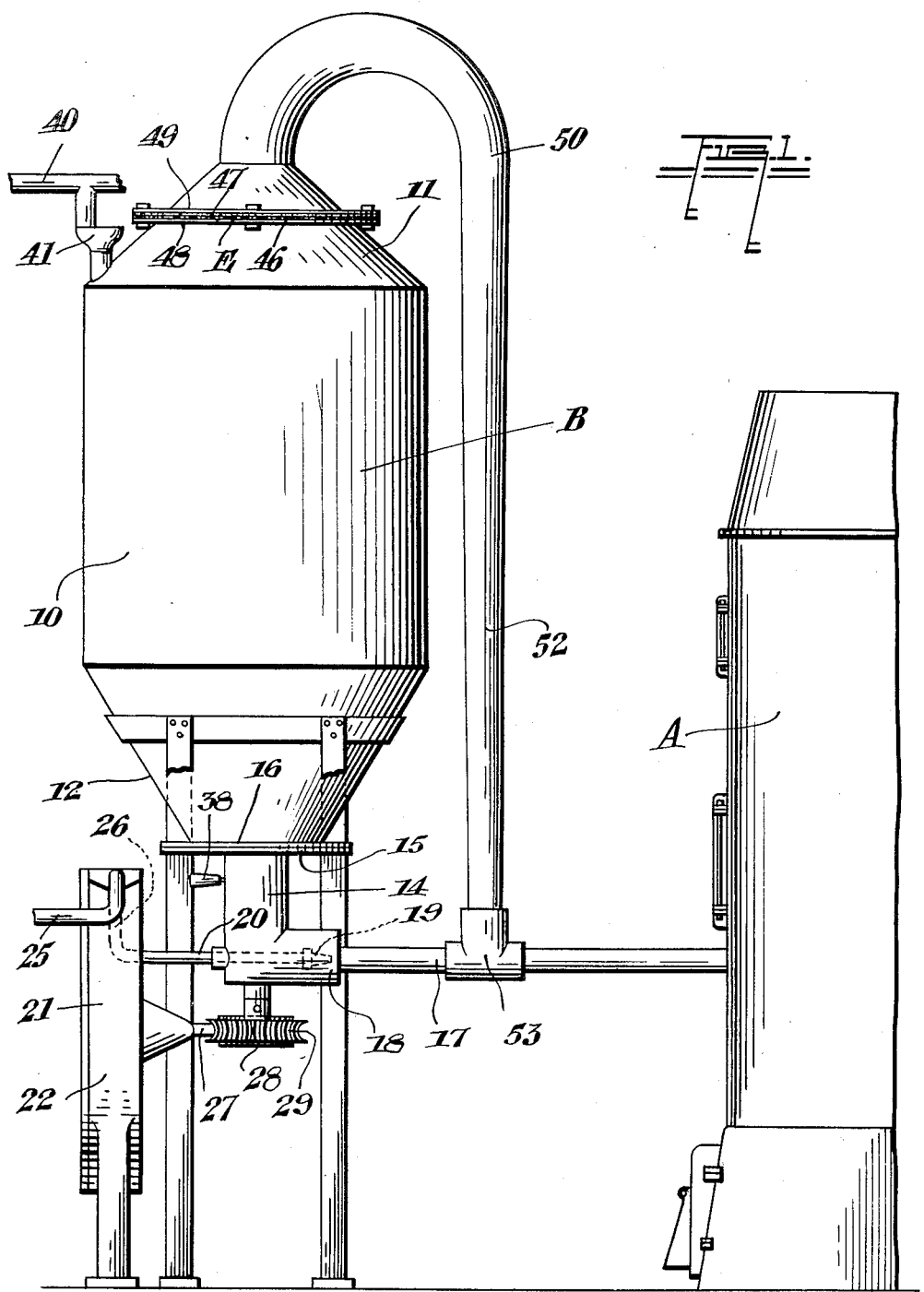
Inventor
Harvey N. Dilling
BY
Attys

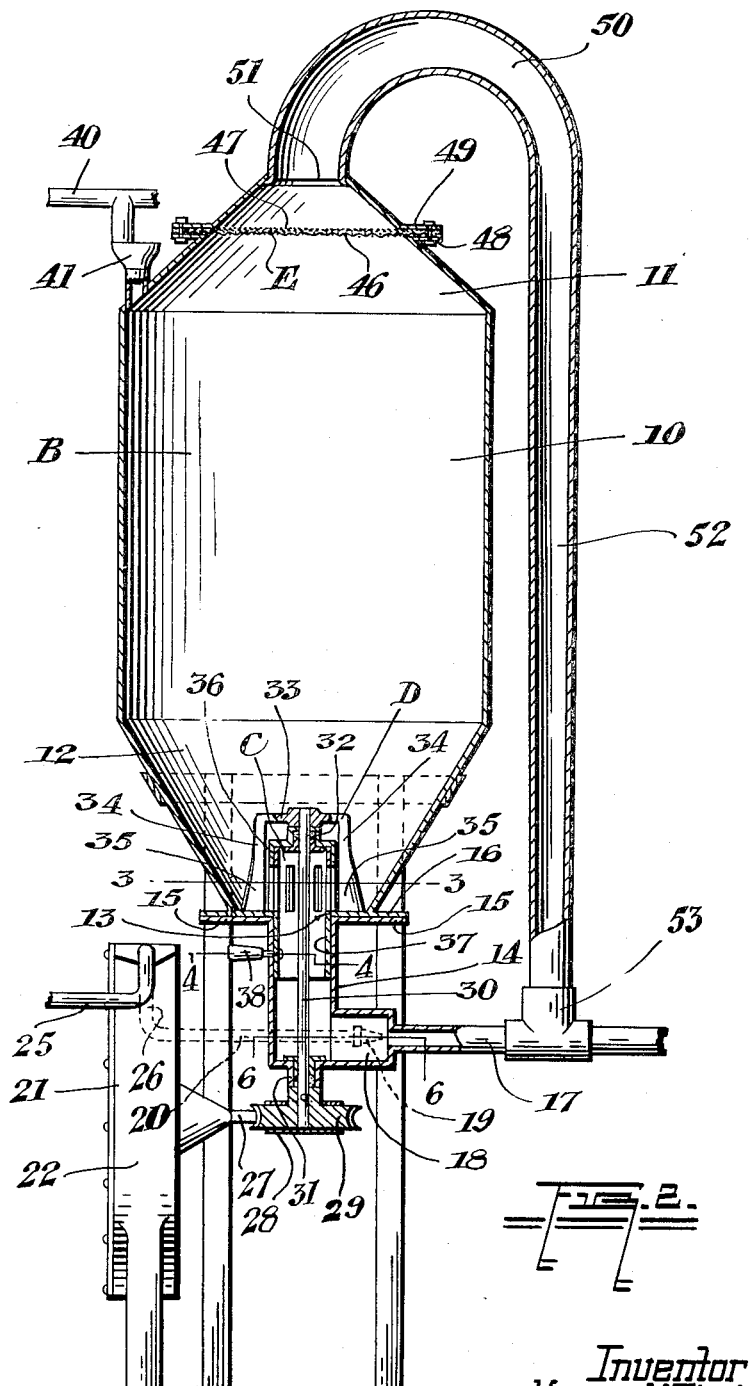

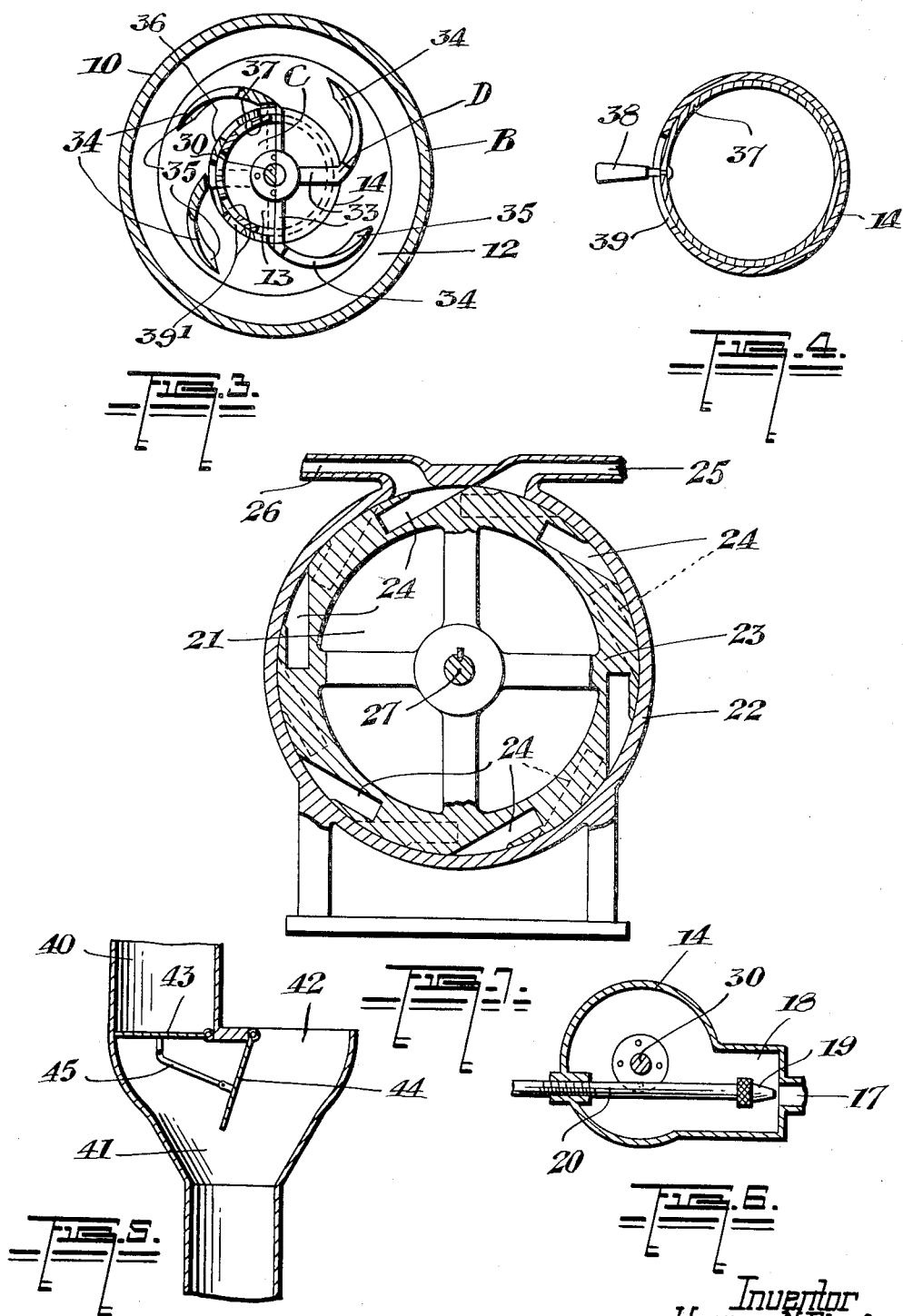

Patented Jan. 16, 1934

1,943,376

UNITED STATES PATENT OFFICE 1,943,376

STOKER FOR PULVERIZED FUEL

Harvey Newell Dilling, Trail, British Columbia, Canada

Application May 11, 1932, Serial No. 610,616, and in Canada June 4, 1931

4 Claims. (Cl. 302—42)

This invention relates to stokers for pulverized fuel and an object of the invention is to provide a compact form of apparatus to efficiently and readily handle pulverized fuel, eliminating superfluous dust and waste of the combustible product.

A further object of the invention is to provide apparatus for positively supplying regulated quantities of pulverized fuel to a furnace or combustion chamber.

A further object of the invention is to provide means for assuring a constant supply of fuel to the furnace, eliminating clogging of the fuel in the apparatus.

A further object of the invention is to combine with the apparatus an air motor for operating the mechanical parts of the apparatus and delivering exhausting air under pressure to the apparatus to impel fuel into the furnace at a regulated speed; to provide for control of the air motor through control of air supply and eliminate the use of an electric motor, blower and variable speed transmission.

A still further object of the invention is to provide a pulverized fuel supplying apparatus which may be readily and economically constructed.

With these and other objects in view, the invention consists essentially of a hopper designed to discharge contained fuel into an ejector casing communicating with a combustion unit through a suitable conduit extending between the casing and the furnace to impel discharged fuel into the combustion unit and supply air thereto, with the provision of means for regulating the supply of discharging fuel from the hopper, means for agitating and positively discharging the fuel from the hopper, and means for collecting and utilizing fuel dust arising within the hopper, as more fully described in the following specification and illustrated in the accompanying drawings, which form part of the same.

In the drawings:—

Figure 1 is a side elevation of the improved apparatus shown in connection with a furnace which is fragmentarily illustrated.

Figure 2 is a longitudinal sectional elevation taken through the apparatus illustrating the discharge openings of the hopper and means for agitating the fuel and regulating the amount of discharging fuel.

Figure 3 is an enlarged section taken on the line 3—3 of Figure 2.

Figure 4 is an enlarged section taken on the line 4—4 of Figure 2.

Figure 5 is a sectional detail view of the fuel supply conduit and air vent for the hopper.

Figure 6 is an enlarged section taken on the line 6—6 of Figure 2, and,

Figure 7 is a section taken through the air motor.

Referring more particularly to the drawings, A indicates the furnace or combustion unit and B indicates the fuel hopper designed to contain fuel to be supplied to the furnace. The hopper B is preferably provided with a body 10 of cylindrical form, formed with the conical truncated ends 11 and 12. The end 12 constitutes the discharge end of the hopper and is provided with a discharge opening 13 arranged centrally thereof. Below the discharge opening of the hopper an ejector casing 14, preferably of cylindrical form, is positioned, being secured to the discharge end 12 of the hopper by means of the flanged portion 15 which is held in engagement with the flange 16 of the hopper through any suitable securing medium. The internal diameter of the ejector casing 14 registers with and exactly coincides with the size of the discharge opening 13 in the base of hopper 10.

The ejector casing is designed to receive fuel discharged from the hopper and is connected with the combustion chamber of the furnace or combustion unit by means of a conduit 17 which communicates with the head 18 of the ejector casing. Within the head of the ejector casing and substantially registering with the conduit 17 is positioned an air nozzle 19 connected to the air conduit 20 which is supplied with air from the air motor 21, so that upon the discharge of fuel into the ejector casing 14, by means of the current of air which discharges from the nozzle 19 into conduit 17, the fuel will be sucked and blown from the ejector casing 14 and through the conduit 17 into the combustion chamber of the furnace, the air from the motor also entering the combustion chamber and providing the proper oxygen mixture for promoting combustion.

The air motor 21 is more particularly illustrated in Figure 7 and consists of an outer cylindrical casing 22 within which the rotor 23 is designed to rotate, the rotor being provided with a plurality of substantially tangentially arranged pockets 24. Compressed air from any suitable source is supplied to the air motor 21 through the conduit 25 and is designed to impinge within the pockets 24 so as to cause rotation of the rotor. An outlet or exhaust conduit 26 is designed to receive the exhaust air from the pockets and, in view of the fact that the pockets 24 are arranged in staggered relation within the rotor on each side thereof, a practically constant supply of exhaust air will be discharged through the outlet conduit 26. The conduit 26, of course, communicates with conduit 20, establishing an air supply for the ejector casing.

By merely regulating the supply of compressed air, the speed of the rotor can be immediately controlled so that the supply of exhausting air to the ejector casing is correspondingly controlled. The rotor is mounted in the usual manner on a shaft 27, the speed of which is governed by the speed of the rotor, and the shaft 27 is designed to project laterally from the casing, being provided with a worm 28 on its projecting end. The worm 28 is designed to mesh with the worm wheel 29 which is rigidly secured on the vertical shaft 30 extending upwardly through the ejector casing and into the discharge end 12 of the hopper. The vertical shaft towards its lower end passes through a suitable gland 31 in the ejector casing which may be lubricated in any suitable manner, preferably by dry graphite, and towards the upper end of the shaft it bears within the gland 32 which is preferably lubricated in a similar manner, the gland 32 being positioned within one part of a fuel discharge regulating means C, which will be described hereinafter. The upper end of the shaft is designed to connect with the spider 33 of an agitator D which consists in a plurality of downwardly extending curved arms 34, more particularly illustrated in Figure 3, which terminate in the blades or vanes 35. These blades are substantially spirally arranged with respect to the shaft 30 and thus, when the agitator is rotated, the vanes will pass in their rotary motion through the pulverized fuel within the bottom of the hopper and tend to convey the fuel towards the discharge opening so that the agitator will function to positively discharge the fuel from the hopper and will obviate any clogging or blocking of the fuel around the discharge end of the hopper which might otherwise occur due to the fact that the fuel in the bottom portion of the hopper will be compacted through the weight of the overlying fuel.

The fuel discharge regulating means consists in an outer cylindrical casing 36 positioned within the discharge end of the hopper, concentrically with the shaft 30 which passes therethrough, the internal diameter of the casing coinciding and registering with the size of the discharge opening 13 and being therefore substantially the same size as the ejector casing 14. Within the outer casing 36 an inner cylindrical sleeve member 37 is designed to be positioned to extend within the walls of the outer casing 36 and downwardly through the discharge opening overlapping the walls of the ejector casing 14. The inner sleeve member 37 is provided with an operating handle 38 which projects through a suitable slot 39 in the ejector casing, more particularly illustrated in Figure 4, and through this medium the inner sleeve 37 may be rotated with respect to the outer casing 36. Each of these casings is provided with a plurality of discharge orifices 39' which are preferably arranged vertically therein and, upon regulating the position of the inner sleeve 37, as illustrated in Figure 3, the size of the discharge openings 39' may be varied so that the fuel discharging from the hopper 10 may be positively regulated.

The hopper 10 is fed with pulverized fuel through the feed conduit 40 which discharges through the receiving member 41 into the hopper. The receiving member, however, is formed with an air vent or passageway 42 and a pair of valves or dampers 43 and 44 are provided for alternatively closing the feed conduit 40 or the air vent 42. As illustrated in Figure 5, the valves or dampers are connected by the common link 45 pivotally connected to a lug on each of the dampers and normally, when fuel is not being supplied to the hopper, the vent 42 will remain open allowing air to circulate into the hopper, the valve or damper 43 being positively closed. The valves or dampers are positioned in this relation by reason of the fact that the damper 44 is made somewhat heavier than the damper 43 and, therefore, through the force of gravity will tend to fall open, closing damper 43. On the other hand, when fuel is being fed to the hopper 10, the weight of the fuel will open damper 43 and automatically close the vent 42.

In order to eliminate dust which may be evolved from the feeding operation or any other cause, a filter E is positioned in the upper end 11 of the hopper, the filter consisting in the screen 46 associated with a sheet of wool or the like 47, which are securely clamped in the upper end 11 of the casing between the flanges 48 and 49 of separable parts of the conical truncated end 11 of the hopper.

A discharge or suction conduit 50 communicates with a discharge opening 51 formed in the end 11 of the hopper 10, the conduit being curved into the vertical extension 52 which communicates with the conduit 17 through the medium of the T-connection 53. Thus, when dust arises within the hopper 10, the finer particles will sift through the filter whereas the heavier particles will be deflected back into the hopper. Any dust arising and traversing the filter will be immediately drawn off through discharge opening 51 and conduit 50 by reason of suction within said conduit created by the force of the air and fuel passing through conduit 17. In this manner, not only dust nuisance is avoided, but any fuel value of the dust is utilized since the dust is immediately forced into the combustion chamber of the furnace. At the same time, the filter serves to avoid any waste since, ordinarily in a dust stream, valuable fuel particles will be carried away from the hopper or bin and the filter in this case will deflect them back into the hopper and also prevent these heavier particles from going through the conduit 50, which might serve to clog this conduit if they entered therein in any appreciable volume.

The operation of the apparatus would appear to be fairly apparent. After charging the hopper 10 with fuel, the regulating sleeve 37 may be operated to allow the desired amount of fuel to pass through to the ejector casing 14 and, upon setting the air motor into operation, the shaft 30 will actuate the agitator D to positively and continuously discharge the desired amount of fuel into the ejector casing. At the same time, the air will discharge through the nozzle 19 into the conduit 17, sucking and blowing the fuel from the ejector casing into the combustion unit, the air at the same time providing the necessary atmosphere to promote combustion. Any dust arising within the hopper will pass through the filter, if fine enough, and be conveyed to the combustion unit through the conduit 50, whereas the heavier particles which cannot traverse the filter E will be deflected back into the hopper.

The speed of operation of the air motor will be entirely governed from the source of compressed air and by controlling the air discharge and fuel discharge the desired amount of fuel and air may be fed to the combustion unit, the amount, of course, being governed by existing conditions.

It will be realized that a very positive fuel feed is provided in the present apparatus due to the provision of the agitator, in addition to the fact that the bottom end of the hopper is formed of conical shape which necessarily concentrates the fuel towards the discharge opening to be discharged in accordance with the regulation of the sleeve 37. The air motor, it will be noted, in addition to supplying air to the combustion unit to promote combustion and also act to convey the fuel into the unit, actuates the agitating means. By using an air motor in combination with the apparatus, the force of the blast may be more readily controlled than in the case of a blower, and the use of an electric motor or the like is entirely eliminated and this also does away with the necessary variable speed transmission. Apart from this, the air blast is composed of the exhausting air so that the unit, in addition to being efficient, is very economical.

From the foregoing it will be readily realized that the objects of my invention have been attained.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim as my invention is:

1. A stoker for combustion units comprising a fuel hopper provided with a discharge outlet, an ejector in communication with the discharge outlet and with the combustion unit, means in connection with the ejector for blowing fuel into the combustion unit, means operating within the discharge outlet for regulating the quantity of fuel, including a fixedly mounted orificed casing projecting within the hopper, a cooperating relatively movable orificed casing, an operating member projecting outside the hopper for moving the second casing relative to the first casing for controlling the size of the orifices and means operating within the hopper cooperating with said fuel regulating means for positively discharging fuel to the ejector during the operation of the stoker, including an agitator formed with a series of vanes adapted to lie adjacent to the fixedly mounted casing and overlie said orifices during rotation and means for rotating said agitator.

2. A stoker for combustion units, comprising a fuel hopper, an ejector in communication with the hopper and the combustion unit, means in connection with the ejector for blowing fuel into the unit, means for positively and constantly supplying fuel from the hopper to the ejector during operation of the stoker, a fuel supply for said hopper, including a ventilating passageway, and means for normally closing said fuel supply and opening the ventilating passageway, said means being operable to close the ventilating passageway and open the fuel supply when fuel is being supplied to the hopper and means in connection with the hopper for collecting dust arising within the hopper during feeding of fuel thereto and discharging said dust into the combustion unit.

3. The device as claimed in claim 2, in which the means for closing the fuel supply and opening the ventilating passageway, comprises a pair of valves link-connected to operate in unison, the valve controlling the ventilating passageway being heavier than the valve for the fuel supply to normally retain the ventilating passageway open.

4. A stoker for combustion units comprising a fuel hopper, provided with a discharge outlet, an ejector in communication with the discharge outlet and with the combination unit, means in connection with the ejector for blowing fuel into the combustion unit, means operating within the discharge outlet for regulating the quantity of discharging fuel, including a cylindrical orificed casing fixedly mounted within the discharge outlet and projecting within the hopper, a cooperating cylindrical relatively movable orificed casing rotatable within the said first casing, and projecting outside the hopper, an operating member connected to said second casing projecting outside the hopper for moving said second casing relative to the first casing to control the size of the discharge orifices and a rotatable shaft traversing said ejector and casings, an agitator mounted on said shaft outside said first orificed casing and having a plurality of vanes designed to project along the outside of said casing and to rotate about said casing and means connected with said shaft for rotating said agitator.

HARVEY NEWELL DILLING.